US010197331B2

(12) United States Patent
Kokugan et al.

(10) Patent No.: US 10,197,331 B2
(45) Date of Patent: *Feb. 5, 2019

(54) SOLID-LIQUID SEPARATION SYSTEM (71) Applicant: Hitachi, Ltd., Chiyoda-ku, Tokyo (JP)

(72) Inventors: Yoko Kokugan, Tokyo (JP); Hiroshi Kusumoto, Tokyo (JP); Tadashi Sano, Tokyo (JP); Michiharu Watanabe, Tokyo (JP); Mitsuhiro Matsuzawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/545,739

(22) PCT Filed: Jan. 26, 2015

(86) PCT No.: PCT/JP2015/051956
§ 371 (c)(1),
(2) Date: Jul. 24, 2017

(87) PCT Pub. No.: WO2016/120952
PCT Pub. Date: Aug. 4, 2016

(65) Prior Publication Data
US 2018/0003438 A1 Jan. 4, 2018

(51) Int. Cl.
F26B 5/00 (2006.01)
B01D 11/02 (2006.01)
(Continued)

(52) U.S. Cl.
CPC ............ F26B 5/005 (2013.01); B01D 5/0003 (2013.01); B01D 5/006 (2013.01); B01D 5/0075 (2013.01);
(Continued)

(58) Field of Classification Search
CPC ....... F26B 5/004; B01D 5/0003; B01D 5/006; B01D 5/0075; B01D 12/00; C02F 11/14
(Continued)

(56) References Cited

U.S. PATENT DOCUMENTS 4,106,307 A * 8/1978 Matsuda ................. F24F 3/001
62/324.4
5,531,080 A * 7/1996 Hirahara ................ C09K 5/045
62/468

(Continued)

FOREIGN PATENT DOCUMENTS

JP      56-67503 A     6/1981
JP   2003-10842 A     1/2003
(Continued)

OTHER PUBLICATIONS

International Search Report (PCT/ISA/210) issued in PCT Application No. PCT/JP2015/051956 dated Apr. 28, 2015 with English translation (six pages).
(Continued)

Primary Examiner — Stephen M Gravini
(74) Attorney, Agent, or Firm — Crowell & Moring LLP (57) ABSTRACT To provide a solid-liquid separation system in which a stable operation can be continuously conducted and the introduction cost and the running cost can be suppressed, in cases where moisture or oil are separated from a substance containing moisture or oil by using changes in phase of a working fluid having a nature of dissolving moisture or oil in a liquid phase. Provided is a solid-liquid separation system in which a working fluid that dissolves moisture or oil in a liquid phase is liquefied and brought into contact with a solid substance to thereby allow the working fluid to contain moisture or oil that has been contained in the solid substance, and then the working fluid is vaporized to pre-
(Continued)

cipitate the moisture or oil, characterized in that the solid-liquid separation system is provided with a fluid circuit in which a high-temperature-side heat exchanger that vaporizes the working fluid by a refrigerant, a low-temperature-side heat exchanger that liquefies the working fluid by the refrigerant are connected to circulate the working fluid, and a refrigerating cycle in which a compressor, a condenser that exchanges heat with a heat source other than the working fluid, the high-temperature-side heat exchanger, an expansion mechanism, and the low-temperature-side heat exchanger are sequentially connected to circulate the refrigerant, and that the solid-liquid separation system includes a recovery operation mode in which the working fluid in a filling tank is vaporized, besides the solid-liquid separation. For performing the recovery operation mode, a second expansion mechanism is provided between the condenser and the high-temperature-side heat exchanger. The system is also characterized in that the fluid circuit is provided with a heating unit that does not use the refrigerant as a heat source.

10 Claims, 6 Drawing Sheets

(51) Int. Cl.
  *B01D 12/00* (2006.01)
  *C02F 11/14* (2006.01)
  *B01D 5/00* (2006.01)
(52) U.S. Cl.
  CPC .............. *B01D 11/02* (2013.01); *B01D 12/00* (2013.01); *C02F 11/14* (2013.01)
(58) Field of Classification Search
  USPC .............................................................. 34/73
  See application file for complete search history.

(56) References Cited

U.S. PATENT DOCUMENTS

| | | | |
|---|---|---|---|
| 7,059,143 B1* | 6/2006 | Zugibe | F25B 49/02 252/68 |
| 8,069,676 B2* | 12/2011 | Kamen | B01D 1/221 62/6 |
| 2005/0210701 A1 | 9/2005 | Kanda et al. | |
| 2015/0075199 A1* | 3/2015 | Kotani | F25B 7/00 62/238.7 |
| 2015/0336829 A1 | 11/2015 | Mochizuki et al. | |
| 2016/0158763 A1 | 6/2016 | Sano et al. | |
| 2017/0311612 A1* | 11/2017 | Leo | A21D 2/34 |
| 2018/0001226 A1* | 1/2018 | Sano | B01D 12/00 |
| 2018/0003438 A1* | 1/2018 | Kokugan | F26B 5/005 |

FOREIGN PATENT DOCUMENTS

| | | |
|---|---|---|
| JP | 4291772 B2 | 7/2009 |
| JP | 2010-201357 A | 9/2010 |
| JP | 2014-4520 A | 1/2014 |
| WO | WO 01/17647 A1 | 3/2001 |
| WO | WO 2015/015631 A1 | 2/2015 |

OTHER PUBLICATIONS

Japanese-language Written Opinion (PCT/ISA/237) issued in PCT Application No. PCT/JP2015/051956 dated Apr. 28, 2015 (five pages).
Japanese-language Office Action issued in counterpart Japanese Application No. 2016-571506 dated Sep. 11, 2018 (two (2) pages).

* cited by examiner

SOLID-LIQUID SEPARATION SYSTEM

TECHNICAL FIELD

The present invention relates to a solid-liquid separation system for separating solid and liquid, and a process of the solid-liquid separation.

BACKGROUND ART

As a process of dewatering a substance containing moisture, a process using a chemical substance (working fluid) that changes in phase with changes in temperature and pressure is known. PTL 1 discloses as an example of processes for removing moisture from a high-moisture solid such as high-moisture coal, a dewatering process that uses a liquefied product of a substance that has high mutual meltability with water and exists as gas at the atmospheric pressure or a temperature near outside air temperatures, such as dimethyl ether.

PTL 1 discloses a configuration as follows. Dimethyl ether is pressurized and increased in pressure by a compressor to be made into gas of high pressure and high temperature. The gas is then cooled in a heat exchanger that performs heat exchange between a high pressure side and a low pressure side, to be converted into liquid of high pressure and low temperature. The liquid is then brought into contact with moisture in a moisture-containing solid in a dehydrator to dissolve the moisture, thereby dewatering the solid. The liquid is then decreased in pressure by an expansion mechanism to be converted into liquid of low pressure and low temperature. The liquid is then heated in a heat exchanger that performs heat exchange between a high pressure side and a low pressure side, to be converted into gas of low pressure and high temperature. The gas is then returned into the compressor.

The document states the following. With the above configuration, after the moisture in the solid substance is eluted in the liquefied dimethyl ether, while only dimethyl ether is selectively vaporized from the mixed liquid of the liquefied dimethyl ether and the moisture to separate the moisture, the moisture is simultaneously removed from the solid substance without being vaporized, and then the vaporized dimethyl ether is liquefied. Accordingly, dimethyl ether can be recycled.

On the other hand, since liquefied dimethyl ether is known to have a property of dissolving not only moisture but also oil, besides high-moisture coal, it is considered that the process can be applied to dewatering and deoiling of a substance containing moisture and oil.

CITATION LIST

Patent Document 1

PTL 1: Japanese Patent No. 4291772

SUMMARY OF INVENTION

Technical Problem

In the related art, dimethyl ether can be reused by recovering and liquefying again the vaporized dimethyl ether. However, the dehydrator is always filled with liquefied dimethyl ether along with the dewatered solid substance. In order for the process to serve as a moisture eliminating system of a solid substance containing moisture, it is required that the solid substance after dewatering is regularly replaced with a solid substance containing moisture before dewatering to sequentially process the solid substance in the system.

As describe above, in the related art, there has been no configuration for recovering the liquefied dimethyl ether in the dehydrator, and no configuration has been made on the concern in bringing out the solid substance after completion of dewatering. If the dehydrator is opened in order to bring out the solid substance and the liquefied dimethyl ether is discarded, dimethyl ether to be circulated in the system is lost, and the running cost can increase for replenishing the same. In addition, since dimethyl ether is a combustible substance, the discarded amount of dimethyl ether released into the air from the dehydrator opened is required to be suppressed from the viewpoint of environmental preservation or safety.

On the other hand, in cases where the related art technique is applied to a solid substance containing oil and water, the following problem arises. First, in a process in which dimethyl ether is directly compressed by a compressor, the compressor may be damaged due to oil of a different kind from hydraulic oil of the compressor that is mixed into the compressor or due to discharge, out of the compressor, of hydraulic oil in the compressor that is dissolved in the liquefied dimethyl ether. For this reason, in the related art, a compressor using no hydraulic oil has to be selected. Although there are a compressor that needs no hydraulic oil, such as a turbo refrigerator, a screw refrigerator, and a reciprocating refrigerator, however, such a compressor has a limited use purpose or a large size, and thus is not a commercially appropriate compressor. In addition, the use of such a compressor may lead to increase in the introduction cost of the system.

The present invention has been made for solving the technical problem of the related art. An object of the present invention is to provide a solid-liquid separation system that can efficiently operate with low energy requirement and can continuously operate with a stabilized temperature in the system, even in cases of dewatering and deoiling a substance containing moisture and oil, by suppressing a discarded amount of a chemical substance such as dimethyl ether in bringing out a solid substance after dewatering or deoiling and by using a fluid that changes in phase with changes in temperature and pressure.

Solution to Problem

For solving the above problems, the present invention provides a solid-liquid separation system in which a working fluid having a property of dissolving moisture or oil in a liquid phase is liquefied and brought into contact with a solid substance to thereby allow the working fluid to contain moisture or oil that has been contained in the solid substance, and then the working fluid is vaporized to precipitate the moisture or oil, characterized in that the solid-liquid separation system is provided with: a fluid circuit in which a high-temperature-side heat exchanger that heats the working fluid by a refrigerant to vaporize the working fluid, a low-temperature-side heat exchanger that cools the working fluid by the refrigerant to liquefy the working fluid, and a filling tank that holds the solid substance are connected to circulated the working fluid; and a refrigerating cycle in which a compressor, a condenser that performs heat exchange with a heat source other than the working fluid, the high-temperature-side heat exchanger, a first expansion means, and the low-temperature-side heat exchanger are connected to circulate the refrigerant, and that the solid-liquid separation system includes a recovery operation mode in which the working fluid in the filling tank is vaporized.

Furthermore, the present invention provides the solid-liquid separation system, characterized in that the fluid circuit is provided with a heating unit that heats the working fluid without using the refrigerant as a heat source.

Furthermore, the present invention provides the solid-liquid separation system, characterized in that the refrigerating cycle is provided with a second expansion means between the condenser and the high-temperature-side heat exchanger.

Furthermore, the present invention provides the solid-liquid separation system, characterized in that the second expansion means further expand, in the recovery operation mode, the refrigerant that has been expanded by the first expansion means.

Furthermore, the present invention provides the solid-liquid separation system, characterized in that at least a part of the high-temperature-side heat exchanger is disposed at a position below the bottom of the filling tank.

Furthermore, the present invention provides the solid-liquid separation system, characterized in that the fluid circuit is provided with a conveyance means for the working fluid in a liquid phase state between the high-temperature-side heat exchanger and the filling tank.

Furthermore, the present invention provides the solid-liquid separation system, characterized in that the fluid circuit is provided with a conveyance means for the working fluid in a gas phase state between the high-temperature-side heat exchanger and the low-temperature-side heat exchanger.

Furthermore, the present invention provides the solid-liquid separation system, characterized in that the filling tank is provided, on the bottom thereof, with a mechanism that prevents the solid substance from flowing out of the filling tank.

Furthermore, the present invention provides the solid-liquid separation system, characterized in that the filling tank is provided with a permanently closable valve on the inlet side and the outlet side of the working fluid.

Furthermore, the present invention provides the solid-liquid separation system, characterized in that a plurality of the filling tanks are provided in parallel in the fluid circuit.

Advantageous Effects of Invention

The solid-liquid separation system of the present invention is provided with the expansion mechanism between the condenser and the high-temperature side heat exchange, thereby making it possible to vaporize the working fluid in bringing out the solid substance after dewatering or deoiling and reduce the amount of the working fluid discarded. Accordingly, it is possible to reduce the loss of dimethyl ether circulating in the fluid circuit and reduce the running cost of the system. Also, the amount of the working fluid released into the air is suppressed, and therefore an effect of safety or environmental preservation can be achieved.

EMBODIMENTS OF INVENTION

Solid-liquid separation systems according to first to third embodiments of the present invention are described in detail hereinafter with reference to FIG. 1 to FIG. 6.

First Embodiment

Figure 1:
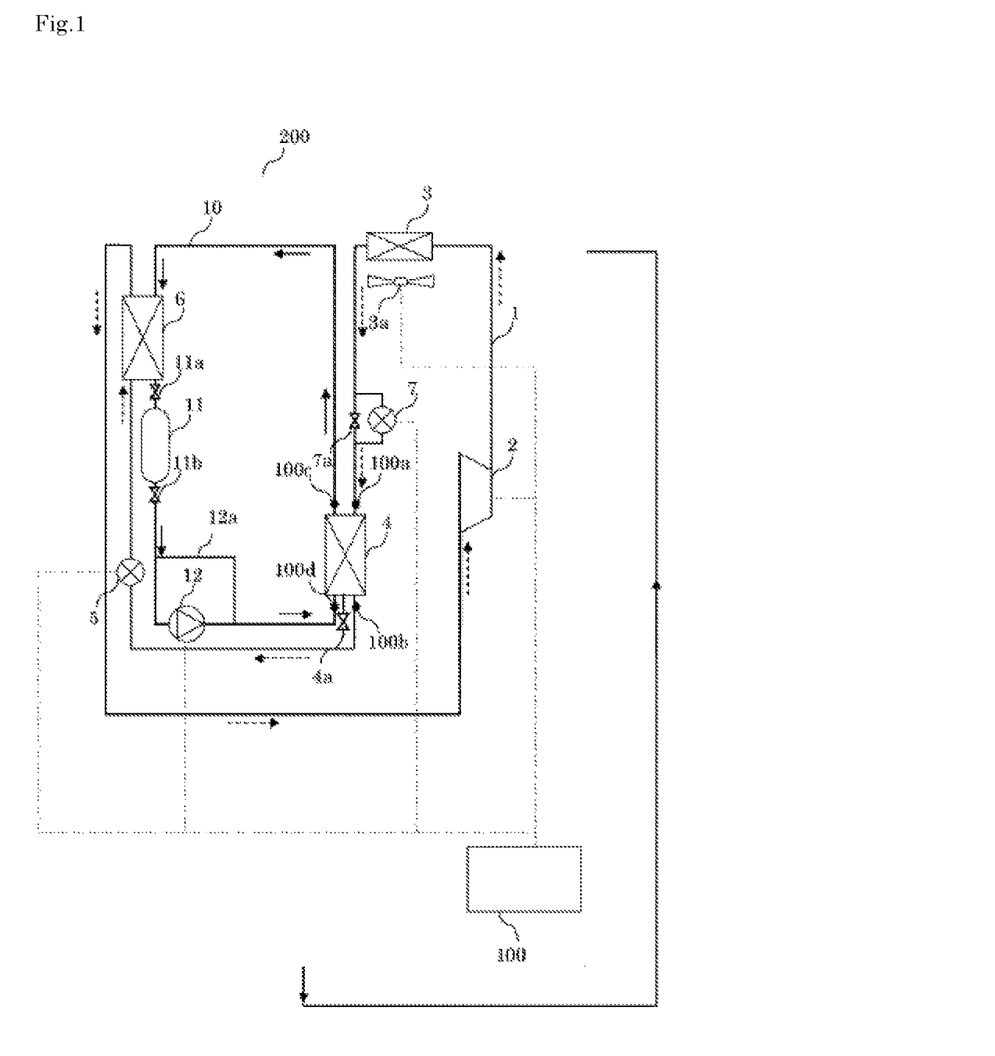
FIG. 1 is a configuration diagram showing a solid-liquid separation system of a first embodiment according to the present invention.
Figure 2:
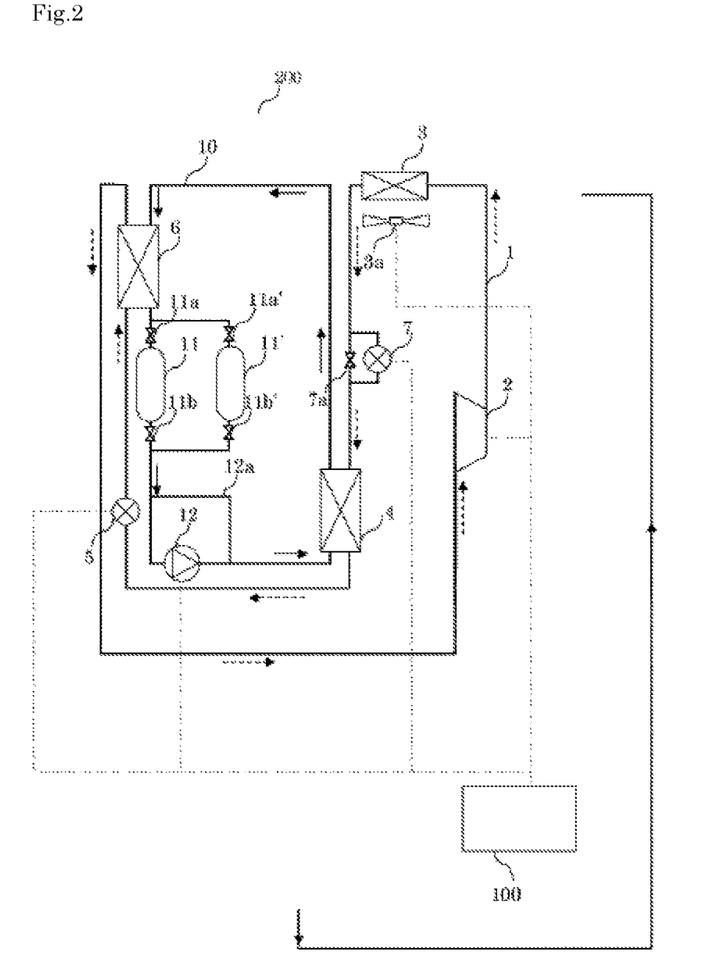
FIG. 2 is a configuration diagram showing a variation of the solid-liquid separation system of the first embodiment according to the present invention.
Figure 3:
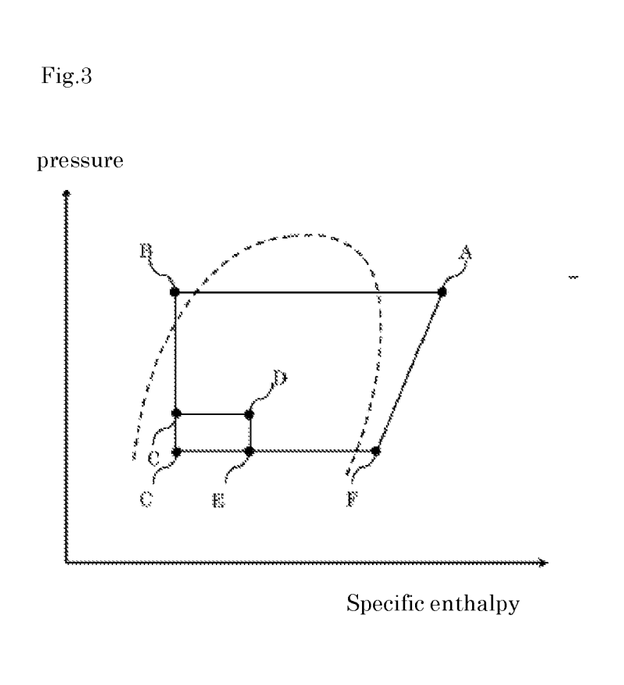
FIG. 3 is a Moller chart showing a state of a refrigerant of the first embodiment according to the present invention.
Figure 4:
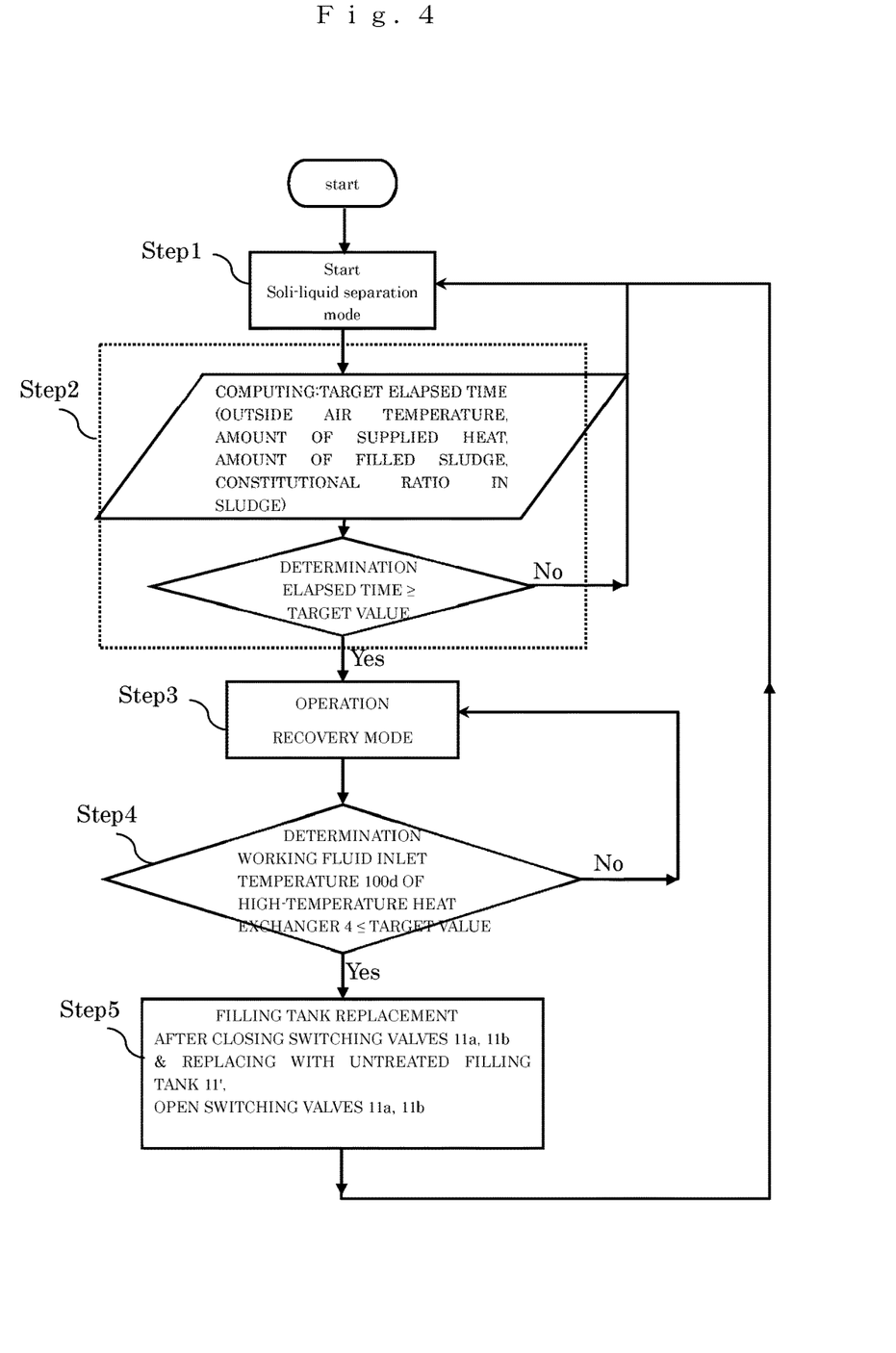
FIG. 4 is a flow chart showing an operation switching control of the solid-liquid separation system of the first embodiment according to the present invention.

First, a configuration and control of a solid-liquid separation system according to a first embodiment of the present invention are described with reference to FIG. 1 to FIG. 4. FIG. 1 to FIG. 3 are configuration diagrams showing a configuration of the solid-liquid separation system in the embodiment. FIG. 4 is a flow chart of the control on operation switching of the solid-liquid separation system in the embodiment. Incidentally, in the following description, an example of dewatering and deoiling of sludge containing moisture and oil is described, but a substance to be separated from a solid substance may be either of moisture and oil, and the solid substance containing moisture or oil is not limited to sludge. For example, the present invention may be applied to various types of solid-liquid separation, such as separation of water and oil and solid in sludge generated in a water treatment, purification of soil contaminated with oil, dewatering and deoiling of plankton, and desorption of impurities adsorbed on activated carbon after use in a water treatment.

First, the configuration in FIG. 1 is described. A solid-liquid separation system 200 is composed of: a refrigerating cycle 1 in which a compressor 2, a condenser 3, a high-temperature-side heat exchanger 4, a first expansion valve 5, and a low-temperature-side heat exchanger 6 are sequentially connected via pipes to circulate a refrigerant; and a fluid circuit 10 in which a pump 12, the high-temperature-side heat exchanger 4, the low-temperature-side heat exchanger 6, and a filling tank 11 are sequentially connected via pipes to circulate a working fluid. In the refrigerating cycle 1, a bypass circuit provided with a second expansion valve 7 is provided between the condenser 3 and the high-temperature-side heat exchanger 4, and flow of the refrigerant to the bypass circuit is controlled by a switching valve 7a. In the fluid circuit 10, a bypass circuit 12a is provided in the pump 12, and the amount of circulation by the pump 12 is regulated by the treated amount of sludge and operation modes.

The refrigerating cycle 1 and the fluid circuit 10 have a configuration in which heat exchange between the refrigerant and the working fluid is performed in each of the high-temperature-side heat exchanger 4 and the low-temperature-side heat exchanger 6. In addition, an ejection valve 4a for an extract is provided in a flow path on the fluid circuit side of the high-temperature-side heat exchanger 4, and the moisture or oil separated from the solid in the high-temperature-side heat exchanger 4 is brought out from the ejection valve 4a.

The high-temperature-side heat exchanger 4 is disposed at a position below the low-temperature-side heat exchanger 6 and the filling tank 11, and liquefied DME can flow in the high-temperature-side heat exchanger 4 by gravity.

Here, R410A is assumed as the refrigerant in the refrigerating cycle 1 and dimethyl ether (hereinunder referred to as DME) is assumed as the working fluid tubed in the fluid circuit 10. However, the refrigerant and the working fluid tubed are not limited thereto. In the fluid circuit 10, any fluid that can dissolve moisture and oil in a liquid state may be used, and besides DME, ethyl methyl ether, formaldehyde, ketene, acetaldehyde, etc. may be used. As the refrigerant in the refrigerating cycle 1, besides R410A, HF01234yf, R134a, R32, etc. may be used.

In addition, the compressor 2 is a variable displacement compressor which can control the capacity. As such a compressor, a piston type, a rotary type, a scroll type, a screw type, and a centrifugal type may be employed. A scroll type compressor is assumed here, and the capacity control is possible by inverter control, and the rotation speed is variable from a low speed to a high speed. The kinds of the refrigerant and the compressor 2 may be selected according to the operating range and use purpose of the system.

The broken arrows in the figure represent the flow direction of R410A, and the solid arrows represent the flow direction of DME. The solid-liquid separation system 200 is provided with: as a means for detecting the temperature of the refrigerant, a refrigerant inlet temperature sensor 100a at the inlet of the refrigerant into the high-temperature-side heat exchanger 4 and a refrigerant outlet temperature sensor 100b at the outlet of the refrigerant; as a means for detecting the temperature of the working fluid, a fluid inlet temperature sensor 100d at the inlet of the working fluid into the high-temperature-side heat exchanger 4 and a fluid outlet temperature sensor 100c at the outlet thereof. A control device 100 receives outputs from the temperature sensors 100a to 100d, and based on the values, controls the rotation number of the compressor 2, the rotation number of a compressor fan 3a, the opening degree of the expansion valve 5, the output of the pump 12, and the opening degrees of the switching valve 7a and the second expansion valve 7.

The solid-liquid separation system 200 of the embodiment includes, in addition to a solid-liquid separation operation for separating moisture and oil from the solid substance, a recovery operation function for vaporizing the working fluid in the filling tank in order to bring out the dewatered and deoiled solid substance.

First, movements of the refrigerant and the working fluid during an operation of the solid-liquid separation system 200 in the solid-liquid separation operation are described. In the solid-liquid separation operation, the switching valve 7a is opened and the second expansion valve 7 is closed.

In the refrigerating cycle 1, R410A is increased in pressure in the compressor 2 to become gas of high temperature and high pressure, a first heat release into the outside air is performed during passing through the condenser 3, and then the refrigerant passes through the switching valve 7a to flow in the high-temperature-side heat exchanger 4. A second heat release is performed to DME in the fluid circuit 10 in the high-temperature-side heat exchanger 4, and the refrigerant changes in phase from gas to a two-phase state, and then to liquid. Thereafter, R410A passes through the expansion valve 5 to thereby decrease in pressure to be converted into a two-phase state of low pressure, and R410A absorbs heat from DME in the fluid circuit 10 during passing through the low-temperature-side heat exchanger 6. R410A changes in phase again from the two-phase state to gas, and is returned to the compressor 2.

On the other hand, in the fluid circuit 10, DME is cooled by R410A in the refrigerating cycle 1 during passing through the low-temperature-side heat exchanger 6, and DME changes in phase from gas to a two-phase state, and further to liquid. Thereafter, the liquefied DME dissolves moisture and oil in sludge in the filling tank 11 filled with sludge, and passes through the pump 12 or the bypass 12a along with the dissolved moisture and oil to move into the high-temperature-side heat exchanger 4. Since the high-temperature heat exchanger 4 is provided with a difference in height with the low-temperature heat exchanger 6 and the filling tank 11, the liquefied DME can move toward the high-temperature-side heat exchanger 4 by using gravity. Accordingly, it is possible to decrease the amount of circulation by the pump 12 to reduce the power.

Incidentally, a film member (not shown) is provided on the bottom of the filling tank 11. According to this, the solid substance does not flow out of the filling tank 11 along with moisture and oil eluted in the liquefied DME.

During passing through the high-temperature-side heat exchanger 4, with heat released from R410A in the refrigerating cycle 1, DME changes in phase from liquid to a two-phase state, and then to gas. The moisture and oil eluted in the liquefied DME remains in the high-temperature-side heat exchanger 4 and discharged from the extract ejection valve 4a. DME vaporized in the high-temperature-side heat exchanger 4 is returned again to the low-temperature-side heat exchanger 6, and thus the liquefaction and vaporization of DME are repeated in the fluid circuit. Through the solid-liquid separation operation, the water and the oil in the sludge in the filling tank 11 are eliminated and kept in the liquefied DME.

Incidentally, in the present invention, the condenser 3 is assumed to be a finned tube heat exchanger, the high-temperature-side heat exchanger 4 is assumed to be a shell and tube heat exchanger, and the low-temperature-side heat exchanger 6 is assumed to be a plate heat exchanger. However, the types thereof are not limited thereto as long as the use purpose is satisfied. In addition, the heat source of the condenser 3 is not limited to air, and chiller and the like may also be used.

Next, movements of the refrigerant and the working fluid in an operation of the solid-liquid separation system 200 during the recovery operation are described. In the solid-liquid separation operation, the switching valve 7a is closed, and the opening degree of the second expansion valve 7a is appropriately adjusted according to the state of the refrigerant.

In the refrigerating cycle 1, R410A is increased in pressure in the compressor 2 to become gas of high temperature and high pressure, then releases heat into the outside air during passing through the condenser 3 to thereby change in phase from gas to a two-phase state, and then into liquid. Then, R410A passes through the second expansion valve 7 to be decreased in pressure and thereby converted into a two-phase state of low pressure and low-temperature, and then flows in the high-temperature-side heat exchanger 4. Then, during passing through the high-temperature-side heat exchanger 4, R410A absorbs heat from DME in the fluid circuit 10, is decreased in pressure again in the first expansion valve 5, and further converted into a refrigerant of low pressure and low-temperature to flow in the low-pressure-side heat exchanger 6. Then during passing through the low-pressure-side heat exchanger 6, R410A absorbs heat again from DME in the fluid circuit 10 to change in phase again from the two-phase state to gas, and is returned to the compressor 2.

On the other hand, in the fluid circuit 10, during passing through the low-temperature-side heat exchanger 6, DME is cooled by R410A in the refrigerating cycle 1 to change in phase from gas to a two-phase state. Then, DME passes through the filling tank 11, and then through the pump 12 or the bypass 12a to move into the high-temperature-side heat exchanger 4. DME is cooled again in the high-temperature-side heat exchanger 4 by R410A in the refrigerating cycle 1 to change in phase into a two-phase state of further low temperature. Then, DME is returned again into the low-temperature-side heat exchanger 6 and cooling of DME is repeated in the fluid circuit. By the cooling repeated, DME is decreased in pressure and the DME in the fluid circuit 10 is converted into a two-phase state.

Here, in the solid-liquid separation system 200 of the embodiment, since the low-pressure side heat exchanger 6 and the filling tank 11 are disposed at a position above the high-temperature-side heat exchanger 4, the liquid part of the two-phase DME is reserved in the high-temperature-side heat exchanger 4 by gravity. At this time, by activating the pump 12, the liquid DME can move to the high-temperature-side heat exchanger 4 early and thus the time period of the recovery operation can be shortened. In addition, the pump 12 may be stopped, and in this case, the liquid DME moves via the bypass circuit 12a. In this case, since the power for the pump can be reduced, the power consumption in the system during the recovery operation can be suppressed. In any cases, since the liquid DME moves into the high-temperature-side heat exchanger by the fluid circuit 10 being continuously cooled, when a certain period of time elapses from the start of the recovery operation, the inside of the filling tank 11 is made into a state where gaseous DME of low density and sludge are enclosed.

The control device 100 of the embodiment estimates the pressure in the filling tank 11 during the recovery operation based on the indication of the temperature sensor 100d and determines the completion of the recovery operation. After the indication of the temperature sensor 100d becomes a target value or less, the control device 100 closes switching valves 11a and 11b and completes the recovery operation. A joint with a pin member called Mushi Oshi (not shown) is provided between the filling tank 11 and each of the switching valves 11a and 11b. By separating the switching valves 11a and 11b and the joint, press of the pin of the joint is released to close a flow path, and therefore, after the switching valve 11a and the switching valve 11b are closed, DME in the fluid circuit does not leak to the circumference even when the filling tank 11 is removed from the fluid circuit 10. The filling tank 11 in which the dewatered and deoiled sludge is enclosed after completion of the solid-liquid separation operation and the recovery operation is removed from the fluid circuit 10 and replaced with a new filling tank 11' filled with sludge containing moisture and oil, and then the solid-liquid separation operation and the recovery operation are repeated again.

As described above, in the solid-liquid separation system 200 of the embodiment, after sludge is dewatered and deoiled using liquefied DME, DME in the filling tank 11 is converted into gas of a lower density than liquid, whereby reduction in DME amount in the fluid circuit 10 at the time of bringing out the dewatered and deoiled sludge can be suppressed. Accordingly, the running cost for replenishing DME into the fluid circuit 10 is reduced. In addition, the amount of DME released into the air at the time of bringing out the dewatered and deoiled sludge is suppressed, and therefore burden on the environment can be reduced. The system is an excellent in these points.

FIG. 2 shows an example of the configuration of the filling tank 11. A solid-liquid separation system 200 shown in FIG. 2 has a configuration in which plural filling tanks 11 are provided in parallel, and the other components are the same as in FIG. 1. The solid-liquid separation system 0 conducts the solid-liquid separation operation and the recovery operation while opening the switching valves 11a and 11b or switching valves 11a' and 11b' by selecting any one of the filling tanks 11 which are disposed in parallel.

With the configuration of FIG. 2, in the solid-liquid separation system 200 of the embodiment, after the solid-liquid separation operation and the recovery operation are completed in any one of the filling tanks, the solid-liquid separation operation and the recovery operation in the other filling tank may be performed. During the operations, bringing out of the treated sludge and filling of the untreated sludge may be conducted, and therefore, the time period for the solid-liquid separation operation can be increased. When the time period for the solid-liquid separation operation is increased, heat to be supplied from the refrigerating cycle 1 is suppressed when the same amount of sludge is treated. Accordingly, even when the other components are the same as in FIG. 1, the solid-liquid separation system 200 shown in FIG. 2 has higher efficiency and can suppress the power consumption.

Incidentally, although the case where two filling tanks 11 are provided was explained in FIG. 2, the number of the filling tanks that are provided in parallel may be arbitrarily determined depending on the time periods for the solid-liquid separation operation and the recovery operation, for bringing out treated sludge, and for filling untreated sludge.

FIG. 3 is a Moller chart showing with the pressure and specific enthalpy, variations in the state of the refrigerant in the refrigerating cycle 1 in the solid-liquid separation system 0 of the embodiment. In the solid-liquid separation operation, the refrigerant becomes gas A of high temperature and high pressure at the outlet of the compressor 2, and by releasing heat into the circumferential air in the condenser 3 and into DME in the high-temperature-side heat exchanger 4, the gas A is converted into liquid B of high-temperature at the outlet of the high-temperature-side heat exchanger 4. Then, by passing through the first expansion valve 5, the refrigerant achieves two-phase C' of low-temperature and low pressure. Then, by absorbing heat from DME, the two-phase C' is converted into gas of low pressure at the outlet of the low-temperature-side heat exchanger 6 to achieve F, and is returned again to the suction of the compressor 2, and such changes in phase are repeated.

In contrast, in the recovery operation, the refrigerant becomes the gas A of high-temperature and high pressure at the outlet of the compressor 2, and by releasing heat into the circumferential air, the gas A is converted into the liquid B of high-temperature at the outlet of the high-temperature-side heat exchanger 4. Then, by passing through the second expansion valve 7, the refrigerant achieves two-phase C of low-temperature and low pressure. Then, by absorbing heat from DME in the high-temperature-side heat exchanger 4, the temperature is increased and the two-phase C is converted to two-phase D, and furthermore, the pressure is decreased during passing through the first expansion valve 5, and the two-phase D is converted into two-phase E of further low temperature and low pressure at the outlet of the expansion valve 5. Then, by absorbing heat again from DME in the low-pressure-side heat exchanger 6, the two-phase E is converted into gas of low pressure at the outlet of the low-temperature-side heat exchanger 6, and the refrigerant thus achieves F, and is returned again to the suction of the compressor 2, and such changes in phase are repeated.

As described above, since the solid-liquid separation system 200 of the embodiment reduces the pressure of the refrigerant in the refrigerating cycle 1 two times, the temperature of the refrigerant in the low-temperature-side heat exchanger 6 can be made lower than the temperature of the refrigerant in the high-temperature-side heat exchanger 4, and thus DEM in the fluid circuit 10 can be efficiently cooled.

FIG. 4 is a flow chart showing a control on operation switching of the solid-liquid separation operation and the recovery operation of the solid-liquid separation system 200 of the embodiment. The control device 100 switches operation according to the flow chart in FIG. 4. Incidentally, as an assumption before the operation, the filling tank 11 has been already filled with sludge containing moisture and oil. First, in Step 1, for dewatering and deoiling the sludge in the filling tank 11, the solid-liquid separation operation is started. In the solid-liquid separation operation, while the switching valve 7a and the bypass circuit 12a are opened and the second expansion valve 7 is closed, operations of the compressor 2, the expansion valve 4, the pump 12, and the condenser fan 3a are started at prescribed rotation numbers or opening degrees. Then, the operation proceeds to Step 2, and based on the circumferential temperature of the solid-liquid separation system 200, the amount of heat supplied to the refrigerating cycle 1, the amount of the sludge filled in the filling tank 11, and the constitutional ratio of the contents (moisture, oil, solid, and the like) of the sludge, the time period for the solid-liquid separation operation is computed, and whether or not the operation time elapses is determined. When the operation time is not reached, the operation returns to Step 1 to continue the solid-liquid separation operation. When the operation time is reached, the operation proceeds to Step 3. Incidentally, the time period for the solid-liquid separation operation is not always computed as the above, and may be fixed as a constant time as long as it is a sufficient time to separate the solid substance and the moisture and oil contained therein.

In Step 3, for suppressing the amount of the working fluid discarded on recovery of the solid substance, DME, which is the working fluid in the filling tank 11, is vaporized to conduct the recovery operation. In the recovery operation, while the bypass circuit 12a is opened and the switching valve 7a is closed, operations of the second expansion valve 7, the compressor 2, the expansion valve 4, the pump 12, and the condenser fan 3a are started at prescribed rotation numbers or opening degrees. Then, the operation proceeds to Step 4, and based on the working fluid-side inlet temperature 100d of the high-temperature-side heat exchanger 4, it is determined whether or not the working fluid in the filling tank 11 reaches a prescribed pressure or lower. When a target value of the working fluid-side inlet temperature 100d is not reached, the operation returns to Step 3 to continue the recovery operation. When the target inlet temperature is reached, the operation proceeds to Step 5.

In Step 5, the content of the filling tank 11 in which the dewatered and deoiled solid substance is enclosed is replaced with an untreated solid substance containing moisture and oil. In the replacement in the filling tank, after the switching valves 11a and 11b are first closed, the filling tank 11 is removed from the solid-liquid separation system 20. In the removed filling tank 11, the gaseous working fluid is discarded, and then the solid substance is brought out to once evacuate the filling tank 11. Then, the untreated solid substance containing moisture and oil is put into the filling tank 11, and the filling tank 11 is drawn by vacuum and then connected again to the solid-liquid separation system 200. After the connection, the switching valves 11a and 11b are opened, and Step 1 to Step 5 are repeated again.

In the solid-liquid separation system 200 of the embodiment, by performing the operation switching control of FIG. 4, the amount of the discarded working fluid is suppressed, and a new solid substance containing water and oil can be sequentially dewatered and deoiled.

Second Embodiment

Figure 5:
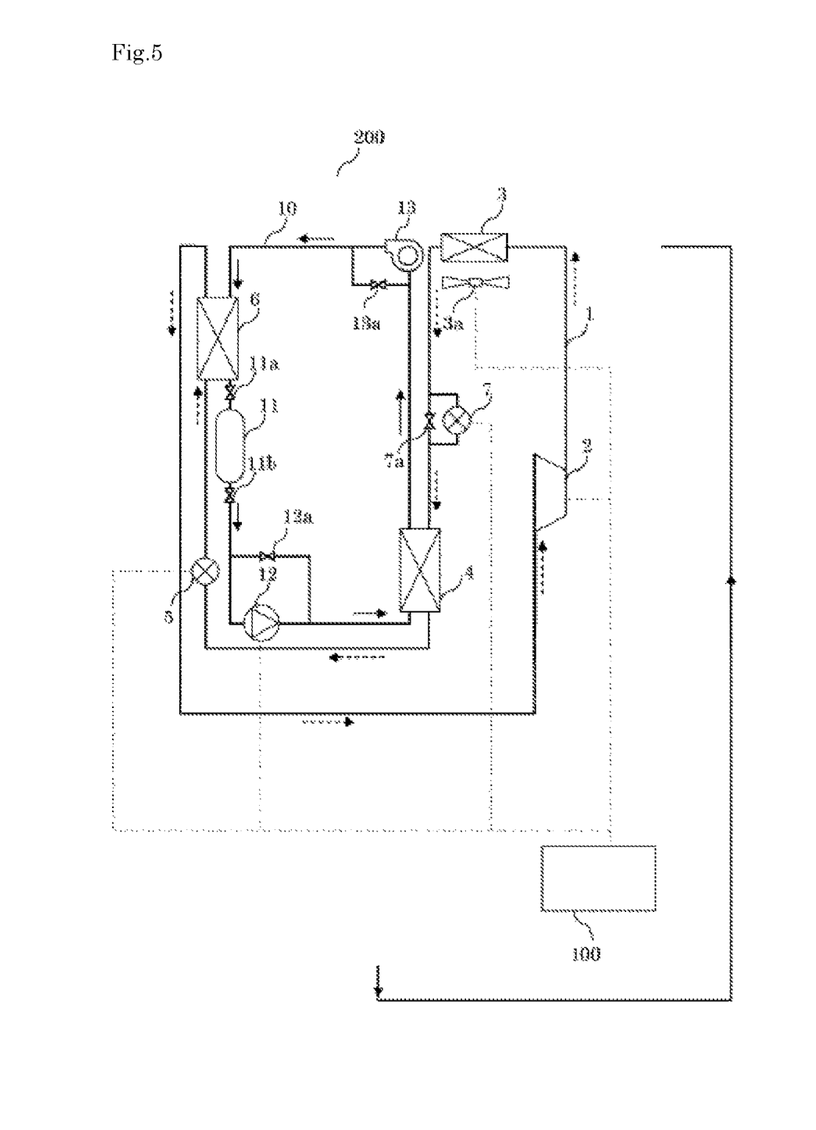
FIG. 5 is a configuration diagram showing a solid-liquid separation system of a second embodiment according to the present invention.

Next, with reference to FIG. 5, a configuration of a solid-liquid separation system according to a second embodiment of the present invention is described. FIG. 5 is a configuration diagram of the solid-liquid separation system 200 of the embodiment which is, as compared with the first embodiment, characterized in that a blower 14 and a bypass circuit 14a are disposed between the high-temperature-side heat exchanger 4 and the low-temperature-side heat exchanger 6 in the fluid circuit 10. Incidentally, explanations of the same structures, controls, and effects as in the first embodiment are omitted.

The fluid circuit 10 of the solid-liquid separation system 200 of the embodiment is configured as follows. That is, in the solid-liquid separation operation, a switching valve 13a is opened, and the pump 12, the high-temperature-side heat exchanger 4, the low-temperature-side heat exchanger 6, and the filling tank 11 are sequentially connected via pipes. On the other hand, in the configuration in the recovery operation, the switching valve 13a is closed, and the pump 12, the high-temperature-side heat exchanger 4, the blower 13, the low-temperature-side heat exchanger 6, and the filling tank 11 are sequentially connected via pipes. Incidentally, the refrigerating cycle 1 has the same configuration as in the first embodiment in both the operations, unless otherwise mentioned.

In the solid-liquid separation system 0 in the embodiment, when the recovery operation is started, DME in the fluid circuit 10 becomes a two-phase state by being cooled with the refrigerant in the refrigerating cycle 1. At this time, the low-temperature-side heat exchanger 6 and the filling tank 11 are disposed at a position above the high-temperature-side heat exchanger 4, the liquid part of the two-phase DME is reserved in the high-temperature-side heat exchanger 4 by gravity. The gaseous part of DME in the high-temperature-side heat exchanger 4 is pushed out by the liquid DME toward the outlet side of the high-temperature-side heat exchanger 4. At this time, by blowing the gaseous DME by the blower 13, the liquid DME in the low-temperature-side heat exchanger 6 and the filling tank 11 can be pushed out toward the high-temperature-side heat exchanger 4.

According to the above, in the solid-liquid separation system 0 of this embodiment, the entire filling tank 11 can be filled with gaseous DME in a short period of time, and the operation time of the recovery operation can be shortened to increase the time period for the solid-liquid separation operation. The increase in the time period for the solid-liquid separation operation results in suppressing the amount of heat suppled from the refrigerating cycle when the same amount of sludge is treated, making it possible to suppress the power consumption.

Third Embodiment

Figure 6:
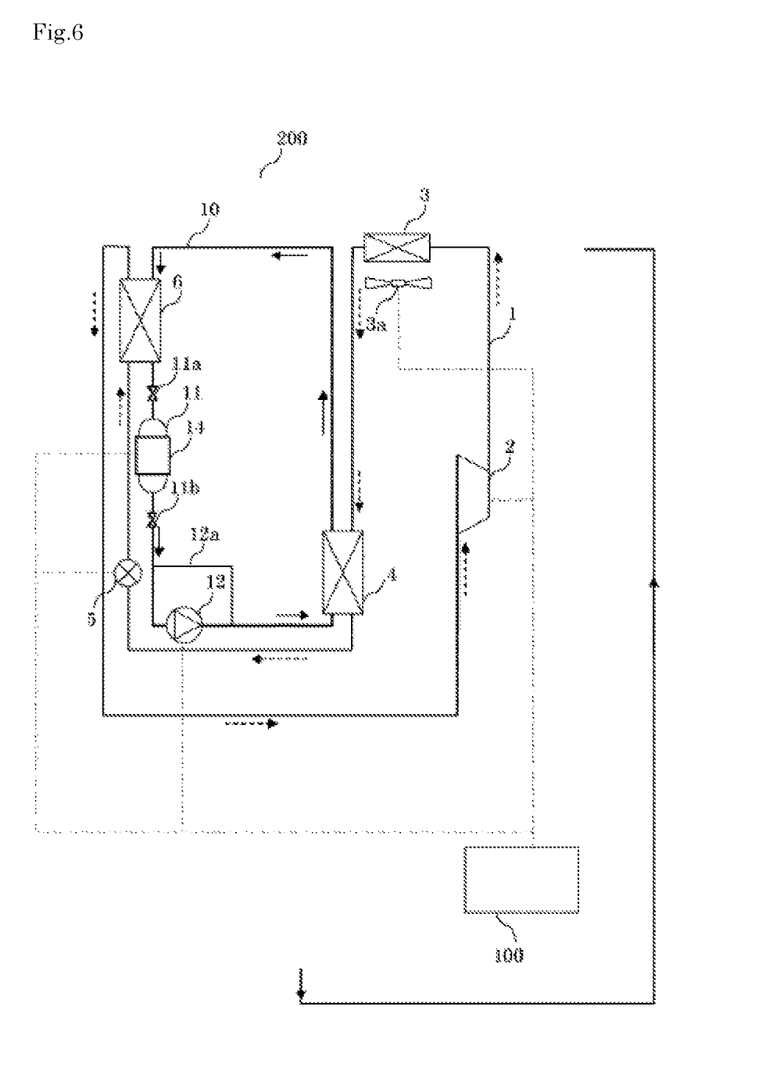
FIG. 6 is a configuration diagram showing a solid-liquid separation system of a third embodiment according to the present invention.

Next, with reference to FIG. 6, a configuration of a solid-liquid separation system according to a third embodiment of the present invention is described. FIG. 6 is a configuration diagram of the solid-liquid separation system of this embodiment which is, as compared with the first embodiment and the second embodiment, characterized by being provided with a heater 14 in the filling tank 11. In the third embodiment, explanation of the same structures, controls, and effects as in the first embodiment and the second embodiment are omitted.

The fluid circuit 10 of the solid-liquid separation system 200 of the embodiment is configured as follows. That is, in the solid-liquid separation operation, while the heater 14 is inactive, the pump 12, the high-temperature-side heat exchanger 4, the low-temperature-side heat exchanger 6, and the filling tank 11 are sequentially connected via pipes. On the other hand, in the recovery operation, the configuration in which the pump 12, the high-temperature-side heat exchanger 4, the blower 13, the low-temperature-side heat exchanger 6, and the filling tank 11 are sequentially connected via pipes is the same, but the switching valve 11a is closed and the heater 14 is activated to heat the filling tank 11. Incidentally, the refrigerating cycle 1 has the same configuration as in the first embodiment in both the operations unless otherwise mentioned.

In the solid-liquid separation system 0 in this embodiment, by closing the switching valve 11a in the recovery operation, flow-in of DME into the filling tank 11 is stopped. Then, by heating the filling tank 11 with the heater 14, DME in the filling tank 11 is heated, and when a certain period of time elapses from the start of the recovery operation, DME in the filling tank 11 changes from the liquid phase to a two-phase. The liquid part of the tow-phase DME is reserved in the high-temperature-side heat exchanger 4 by gravity, and the filling tank 11 is filled with gaseous DME. Accordingly, the inside of the filling tank 11 is made into a state where gaseous DME of low density and sludge are enclosed.

In this manner, in the solid-liquid separation system 200 of the embodiment, it is not required to change the flow path of the refrigerant between the solid-liquid separation operation and the recovery operation, making it possible to simplify the piping configuration and to eliminate the second expansion valve. Accordingly, in the solid-liquid separation system 200 of the embodiment, by making DME in the filling tank 11 gas which has lower density than liquid, the amount of DME in the fluid circuit 10 discarded at the time of bringing out the dewatered and deoiled sludge can be suppressed to reduce the running cost, and in addition, the initial cost in the production of the solid-liquid separation system 200 can be reduced.

In addition, the system configuration can be easily applied to the solid-liquid separation system 0 provided with the second expansion valve according to the first embodiment and the second embodiment, and by providing both the second expansion valve in the refrigerating cycle 1 and the heater 14 in the fluid circuit 10, a system having redundancy can be realized.

REFERENCE SIGNS LIST

200: Solid-liquid separation system
1: Refrigerating cycle
2: Compressor
3: Condenser
3a: Condenser fan
4: High-temperature-side heat exchanger
5: First expansion valve
6: Low-temperature-side heat exchanger
7: Second expansion valve
7a: Switching valve
8: Flow rate regulation valve
10: Fluid circuit
11: Filling tank
11a, 11b: Switching valve
12: Pump
12a: Bypass circuit
13: Blower
13a: Switching valve
14: Heater
100: Control device
100a to 100d: Temperature sensor
[FIG. 3]
PRESSURE
SPECIFIC ENTHALPY
[FIG. 4]
Step 1: START
OPERATION
SOLID-LIQUID SEPARATION MODE
Step 2: COMPUTING: TARGET ELAPSED TIME
(OUTSIDE AIR TEMPERATURE, AMOUNT OF SUPPLIED HEAT, AMOUNT OF FILLED SLUDGE, CONSTITUTIONAL RATIO IN SLUDGE)
DETERMINATION
ELAPSED TIME TARGET VALUE
Step 3: OPERATION
RECOVERY MODE
Step 4: DETERMINATION
WORKING FLUID INLET TEMPERATURE 100d OF HIGH-TEMPERATURE
HEAT EXCHANGER 4≤TARGET VALUE
Step 5: FILLING TANK REPLACEMENT
AFTER CLOSING SWITCHING VALVES 11a, 11b & REPLACING WITH UNTREATED FILLING TANK 11',
OPEN SWITCHING VALVES 11a, 11b

The invention claimed is:

1. A solid-liquid separation system in which a dimethyl ether working fluid having a property of dissolving moisture or oil in a liquid phase is liquefied and brought into contact with a solid substance to thereby allow the working fluid to contain moisture or oil that has been contained in the solid substance, and then the working fluid is vaporized to precipitate the moisture or oil, the solid-liquid separation system comprising:
   a fluid circuit in which a high-temperature-side heat exchanger that heats the working fluid by a refrigerant to vaporize the working fluid, a low-temperature-side heat exchanger that cools the working fluid by the refrigerant to liquefy the working fluid, and a filling tank that holds the solid substance are connected to circulate the working fluid; and
   a refrigerating cycle in which a compressor, a condenser that performs heat exchange with a heat source other than the working fluid, the high-temperature-side heat exchanger, a first expansion means, and the low-temperature-side heat exchanger are connected to circulate the refrigerant;
   wherein the solid-liquid separation system, in a recovery operation mode, vaporizes the dimethyl ether working fluid in the filling tank.

2. The solid-liquid separation system according to claim 1, wherein the fluid circuit is provided with a heating unit that heats the working fluid without using the refrigerant as a heat source.

3. The solid-liquid separation system according to claim 1, wherein the refrigerating cycle is provided with a second expansion means between the condenser and the high-temperature-side heat exchanger.

4. The solid-liquid separation system according to claim 3, wherein the second expansion means further expands, in the recovery operation mode, the refrigerant that has been expanded by the first expansion means.

5. The solid-liquid separation system according to claim 1, wherein at least a part of the high-temperature-side heat exchanger is disposed at a position below the bottom of the filling tank.

6. The solid-liquid separation system according to claim 1, wherein the fluid circuit is provided with a conveyance means for the working fluid in a liquid phase state between the high-temperature-side heat exchanger and the filling tank.

7. The solid-liquid separation system according to claim 1, wherein the fluid circuit is provided with a conveyance means for the working fluid in a gas phase state between the high-temperature-side heat exchanger and the low-temperature-side heat exchanger.

8. The solid-liquid separation system according to claim 1, wherein the filling tank is provided, on the bottom thereof, with a mechanism for preventing the solid substance from flowing out of the filling tank.

9. The solid-liquid separation system according to claim 1, wherein the filling tank is provided with a permanently closable valve on the inlet side and the outlet side of the working fluid.

10. The solid-liquid separation system according to claim 1, wherein a plurality of the filling tanks are provided in parallel in the fluid circuit.

* * * * *